US008379963B2

(12) United States Patent
Kim et al.

(10) Patent No.: US 8,379,963 B2
(45) Date of Patent: Feb. 19, 2013

(54) VISUAL INSPECTION SYSTEM

(75) Inventors: Moon J. Kim, Wappingers Falls, NY (US); Yumi Mori, Yamato (JP); Hiroki Nakano, Shiga (JP); Masakuni Okada, Atsugi (JP)

(73) Assignee: International Business Machines Corporation, Armonk, NY (US)

( * ) Notice: Subject to any disclaimer, the term of this patent is extended or adjusted under 35 U.S.C. 154(b) by 1270 days.

(21) Appl. No.: 12/057,942

(22) Filed: Mar. 28, 2008

(65) Prior Publication Data

US 2009/0245615 A1    Oct. 1, 2009

(51) Int. Cl.
*G06K 9/00* (2006.01)

(52) U.S. Cl. ........ 382/141; 382/142; 382/143; 382/144; 382/145; 382/146; 382/147; 382/307; 710/2; 710/313

(58) Field of Classification Search .......... 382/141–147, 382/307; 710/2, 313
See application file for complete search history.

(56) References Cited

U.S. PATENT DOCUMENTS

| | | | |
|---|---|---|---|
| 4,517,593 A | 5/1985 | Keller et al. | |
| 4,893,188 A | 1/1990 | Murakami et al. | |
| 5,136,662 A | 8/1992 | Maruyama et al. | |
| 5,506,999 A | 4/1996 | Skillman et al. | |
| 5,621,811 A | 4/1997 | Roder et al. | |
| 5,659,630 A | 8/1997 | Forslund | |
| 5,721,883 A | 2/1998 | Katsuo et al. | |
| 5,809,078 A | 9/1998 | Tani et al. | |
| 5,956,081 A | 9/1999 | Katz et al. | |
| 6,023,637 A | 2/2000 | Liu et al. | |
| 6,025,854 A * | 2/2000 | Hinz et al. | 345/538 |
| 6,081,659 A | 6/2000 | Garza et al. | |
| 6,166,373 A * | 12/2000 | Mao | 250/226 |
| 6,215,898 B1 * | 4/2001 | Woodfill et al. | 382/154 |
| 6,404,902 B1 | 6/2002 | Takano et al. | |
| 6,456,737 B1 | 9/2002 | Woodfill et al. | |
| 6,487,619 B1 * | 11/2002 | Takagi | 710/105 |
| 6,549,992 B1 | 4/2003 | Armangau et al. | |
| 6,567,622 B2 | 5/2003 | Phillips | |
| 6,647,415 B1 | 11/2003 | Olarig et al. | |
| 6,661,931 B1 | 12/2003 | Kawada | |
| 6,671,397 B1 | 12/2003 | Mahon et al. | |
| 6,744,931 B2 | 6/2004 | Komiya et al. | |

(Continued)

FOREIGN PATENT DOCUMENTS

| | | |
|---|---|---|
| EP | 1345120 A2 | 9/2003 |
| WO | 0068884 A1 | 4/2000 |

OTHER PUBLICATIONS

Yang, U.S. Appl. No. 11/767,728, Office Action Communication, Oct. 28, 2011, 33 pages.

(Continued)

*Primary Examiner* — Jayesh A Patel

(74) *Attorney, Agent, or Firm* — William E. Schiesser; Hoffman Warnick LLC

(57) ABSTRACT

This solution relates to machine vision computing environments, and more specifically relates to a system and method for selectively accelerating the execution of image processing applications using a cell computing system. The invention provides a high performance machine vision system over the prior art and provides a method for executing image processing applications on a Cell and BPE3 image processing system. Moreover, implementations of the invention provide a machine vision system and method for distributing and managing the execution of image processing applications at a fine-grained level via a PCIe connected system. The hybrid system is replaced with the BPE3 and the switch is also eliminated from the prior in order to meet over 1 GB processing requirement.

18 Claims, 10 Drawing Sheets

U.S. PATENT DOCUMENTS

| | | | |
|---|---|---|---|
| 6,825,943 B1 | 11/2004 | Barr et al. | |
| 6,829,378 B2 | 12/2004 | DiFilippo et al. | |
| 6,898,634 B2 | 5/2005 | Collins et al. | |
| 6,898,670 B2 | 5/2005 | Nahum | |
| 6,950,394 B1 | 9/2005 | Chou et al. | |
| 6,978,894 B2 | 12/2005 | Mundt | |
| 7,000,145 B2 | 2/2006 | Werner et al. | |
| 7,016,996 B1 | 3/2006 | Schober | |
| 7,043,745 B2 | 5/2006 | Nygren et al. | |
| 7,065,618 B1 | 6/2006 | Ghemawat et al. | |
| 7,076,569 B1 | 7/2006 | Bailey et al. | |
| 7,095,882 B2 | 8/2006 | Akahori | |
| 7,102,777 B2 | 9/2006 | Haraguchi | |
| 7,106,895 B1 | 9/2006 | Goldberg et al. | |
| 7,142,725 B2 | 11/2006 | Komiya et al. | |
| 7,171,036 B1 | 1/2007 | Liu et al. | |
| 7,225,324 B2 | 5/2007 | Huppenthal et al. | |
| 7,243,116 B2 | 7/2007 | Suzuki et al. | |
| 7,299,322 B2 | 11/2007 | Hosouchi et al. | |
| 7,327,889 B1 | 2/2008 | Imai et al. | |
| 7,430,622 B1 | 9/2008 | Owen | |
| 7,480,441 B2 | 1/2009 | Klausberger et al. | |
| 7,523,148 B2 | 4/2009 | Suzuki et al. | |
| 7,602,394 B2 | 10/2009 | Seki et al. | |
| 7,605,818 B2 | 10/2009 | Nagao et al. | |
| 7,743,087 B1 | 6/2010 | Anderson et al. | |
| 7,801,895 B2 | 9/2010 | Hepper et al. | |
| 8,052,272 B2 | 11/2011 | Smith et al. | |
| 8,078,837 B2 | 12/2011 | Kajihara | |
| 8,086,660 B2 * | 12/2011 | Smith | 709/201 |
| 8,094,157 B1 | 1/2012 | Le Grand | |
| 2002/0002636 A1 | 1/2002 | Vange et al. | |
| 2002/0129216 A1 | 9/2002 | Collins | |
| 2002/0164059 A1 | 11/2002 | DiFilippo et al. | |
| 2002/0198371 A1 | 12/2002 | Wang | |
| 2003/0031355 A1 | 2/2003 | Nagatsuka | |
| 2003/0053118 A1 | 3/2003 | Muramoto et al. | |
| 2003/0092980 A1 | 5/2003 | Nitz | |
| 2003/0113034 A1 | 6/2003 | Komiya et al. | |
| 2004/0024810 A1 | 2/2004 | Choubey et al. | |
| 2004/0062265 A1 | 4/2004 | Poledna | |
| 2004/0062454 A1 | 4/2004 | Komiya et al. | |
| 2004/0091243 A1 | 5/2004 | Theriault et al. | |
| 2004/0122790 A1 | 6/2004 | Walker et al. | |
| 2004/0143631 A1 | 7/2004 | Banerjee et al. | |
| 2004/0153751 A1 | 8/2004 | Marshal et al. | |
| 2004/0156546 A1 | 8/2004 | Kloth | |
| 2004/0170313 A1 | 9/2004 | Nakano et al. | |
| 2004/0186371 A1 | 9/2004 | Toda | |
| 2004/0217956 A1 | 11/2004 | Besl et al. | |
| 2004/0228515 A1 | 11/2004 | Okabe et al. | |
| 2004/0233036 A1 | 11/2004 | Sefton | |
| 2004/0252467 A1 | 12/2004 | Dobbs et al. | |
| 2005/0013960 A1 | 1/2005 | Ozeki et al. | |
| 2005/0022038 A1 | 1/2005 | Kaushik et al. | |
| 2005/0044132 A1 | 2/2005 | Campbell et al. | |
| 2005/0063575 A1 * | 3/2005 | Ma et al. | 382/128 |
| 2005/0080928 A1 | 4/2005 | Beverly et al. | |
| 2005/0083338 A1 | 4/2005 | Yun et al. | |
| 2005/0093990 A1 * | 5/2005 | Aoyama | 348/222.1 |
| 2005/0113960 A1 | 5/2005 | Karau et al. | |
| 2005/0126505 A1 | 6/2005 | Gallager et al. | |
| 2005/0219253 A1 | 10/2005 | Piazza et al. | |
| 2005/0259866 A1 | 11/2005 | Jacobs et al. | |
| 2005/0263678 A1 | 12/2005 | Arakawa | |
| 2006/0013473 A1 | 1/2006 | Woodfill et al. | |
| 2006/0117238 A1 | 6/2006 | DeVries et al. | |
| 2006/0135117 A1 | 6/2006 | Laumen et al. | |
| 2006/0149798 A1 | 7/2006 | Yamagami | |
| 2006/0171452 A1 | 8/2006 | Waehner | |
| 2006/0184296 A1 | 8/2006 | Voeller et al. | |
| 2006/0190627 A1 | 8/2006 | Wu et al. | |
| 2006/0235863 A1 | 10/2006 | Khan | |
| 2006/0239194 A1 | 10/2006 | Chapell | |
| 2006/0250514 A1 | 11/2006 | Inoue et al. | |
| 2006/0268357 A1 | 11/2006 | Vook et al. | |
| 2006/0269119 A1 | 11/2006 | Goldberg et al. | |
| 2006/0274971 A1 | 12/2006 | Kumazawa et al. | |
| 2006/0279750 A1 | 12/2006 | Ha | |
| 2007/0126744 A1 | 6/2007 | Tsutsumi | |
| 2007/0146491 A1 * | 6/2007 | Tremblay et al. | 348/211.99 |
| 2007/0159642 A1 | 7/2007 | Choi | |
| 2007/0229888 A1 | 10/2007 | Matsui | |
| 2007/0245097 A1 | 10/2007 | Gschwind et al. | |
| 2007/0250519 A1 | 10/2007 | Fineberg et al. | |
| 2008/0013862 A1 | 1/2008 | Isaka et al. | |
| 2008/0036780 A1 | 2/2008 | Liang et al. | |
| 2008/0063387 A1 | 3/2008 | Yahata et al. | |
| 2008/0092744 A1 | 4/2008 | Storbo et al. | |
| 2008/0129740 A1 * | 6/2008 | Itagaki et al. | 345/502 |
| 2008/0140771 A1 | 6/2008 | Vass et al. | |
| 2008/0144880 A1 | 6/2008 | DeLuca | |
| 2008/0147781 A1 | 6/2008 | Hopmann et al. | |
| 2008/0177964 A1 | 7/2008 | Takahashi et al. | |
| 2008/0259086 A1 * | 10/2008 | Doi et al. | 345/502 |
| 2008/0260297 A1 * | 10/2008 | Chung et al. | 382/307 |
| 2008/0263154 A1 | 10/2008 | Van Datta | |
| 2008/0270979 A1 | 10/2008 | McCool et al. | |
| 2009/0003542 A1 | 1/2009 | Ramanathan et al. | |
| 2009/0052542 A1 | 2/2009 | Romanovskiy et al. | |
| 2009/0066706 A1 | 3/2009 | Yasue et al. | |
| 2009/0074052 A1 | 3/2009 | Fukuhara et al. | |
| 2009/0083263 A1 | 3/2009 | Felch et al. | |
| 2009/0089462 A1 | 4/2009 | Strutt | |
| 2009/0150555 A1 | 6/2009 | Kim et al. | |
| 2009/0150556 A1 | 6/2009 | Kim et al. | |
| 2009/0187654 A1 | 7/2009 | Raja et al. | |
| 2009/0265396 A1 | 10/2009 | Ram et al. | |
| 2010/0060651 A1 | 3/2010 | Gala | |

OTHER PUBLICATIONS

Tsai, U.S. Appl. No. 11/738,723, Office Action Communication, Nov. 4, 2011, 15 pages.
Entezari, U.S. Appl. No. 12/028,073, Office Action Communication, Dec. 2, 2011, 51 pages.
Tsai, U.S. Appl. No. 11/738,711, Office Action Communication, Nov. 4, 2011, 14 pages.
Chambers, U.S. Appl. No. 11/951,709, Office Action Communication, Nov. 29, 2010, 21 pages.
Yang, U.S. Appl. No. 11/877,926, Office Action Communication, Nov. 22, 2010, 33 pages.
Cosby, U.S. Appl. No. 11/940,470, Office Action Communication, Nov. 26, 2010, 19 pages.
Ansari, U.S. Appl. No. 11/940,506, Office Action Communication, Oct. 29, 2010, 21 pages.
Tsai, U.S. Appl. No. 11/738,711, Office Action Communication, Nov. 9, 2010, 13 pages.
Yang, U.S. Appl. No. 11/767,728, Office Action Communication, Nov. 19, 2010, 25 pages.
Tsai, U.S. Appl. No. 11/738,723, Office Action Communication, Nov. 17, 2010, 13 pages.
Kim et al., U.S. Appl. No. 11/940,506, Office Action Communication, Nov. 2, 2009, 20 pages.
Kim et al., U.S. Appl. No. 11/951,709, Office Action Communication, Nov. 17, 2009, 20 pages.
Kim et al., U.S. Appl. No. 11/951,712, Office Action Communication, Sep. 9, 2009, 26 pages.
Kim et al., U.S. Appl. No. 11/940,470, Office Action Communication, Nov. 18, 2009, 31 pages.
PCT Search Report, International Application No. PCT/EP2008/054331, Oct. 4, 2008, 10 pages.
Tsung Yin Tsai, U.S. Appl. No. 11/738,711, Office Action Communication, Feb. 28, 2011, 17 pages.
Tsung Yin Tsai, U.S. Appl. No. 11/738,723, Office Action Communication, Feb. 18, 2011, 17 pages.
Cosby, Lawrence V., U.S. Appl. No. 11/940,470, Office Action Communication, Mar. 4, 2011, 22 pages.
Yang, Qian, U.S. Appl. No. 11/767,728, Office Action Communication, Mar. 15, 2011, 34 pages.
Yang, Qian, U.S. Appl. No. 11/877,926, Office Action Communication, Mar. 23, 2011, 32 pages.
Bitar, Nancy, U.S. Appl. No. 11/782,170, Office Action Communication, Mar. 17, 2011, 19 pages.

Yang, U.S. Appl. No. 11/767,728, Office Action Communication, Feb. 16, 2012, 33 pages.
Bitar, U.S. Appl. No. 11/782,170, Notice of Allowance and Fees Due, Feb. 21, 2012, 20 pages.
Chambers, U.S. Appl. No. 11/951,709, Office Action Communication, Mar. 21, 2012, 27 pages.
Entezari, U.S. Appl. No. 12/028,073, Notice of Allowance & Fees Due, Mar. 21, 2012, 18 pages.
Do, U.S. Appl. No. 11/668,875, Notice of Allowance & Fees Due, Aug. 13, 2010, 9 pages.
Do, U.S. Appl. No. 11/668,875, Notice of Allowance & Fees Due, Sep. 20, 2010, 8 pages.
Kuhnen, PCT / EP2008 / 050443, Invitation to Pay Additional Fees, Apr. 25, 2008, 6 pages.
Eveno, PCT / EP2008 / 050443, International Search Report, Jul. 22, 2008, 5 pages.
Cussac, PCT / EP2008 / 050443, PCT International Preliminary Report on Patentability, Aug. 4, 2009, 8 pages.
Tiv, U.S. Appl. No. 11/951,712, Office Action Communication, Jan. 5, 2011, 18 pages.
Chambers, U.S. Appl. No. 11/951,709, Office Action Communication, Dec. 20, 2011, 40 pages.
Cosby, U.S. Appl. No. 11/940,470, Office Action Communication, Dec. 22, 2011, 41 pages.
Yang, U.S. Appl. No. 11/877,926, Office Action Communication, Jan. 4, 2012, 40 pages.
Chung et al., U.S. Appl. No. 11/738,711, Office Action Communication, Jun. 25, 2010, 26 pages.
Chung et al., U.S. Appl. No. 11/738,723, Office Action Communication, Jun. 24, 2010, 26 pages.
Kim et al., U.S. Appl. No. 11/951,712, Office Action Communication, Jul. 23, 2010, 25 pages.
Yang, U.S. Appl. No. 11/767,728, Office Action Communication, Jul. 28, 2011, 32 pages.
Bitar, U.S. Appl. No. 11/782,170, Office Action Communication, Sep. 16, 2011, 21 pages.
Tsai, U.S. Appl. No. 11/738,711, Office Action Communication, Sep. 23, 2011, 20 pages.
Tsai, U.S. Appl. No. 11/738,723, Office Action Communication, Sep. 27, 2011, 20 pages.
Tiv, U.S. Appl. No. 11/951,712, Office Action Communication, Oct. 21, 2011, 27 pages.
Kim et al., U.S. Appl. No. 11/940,470, Office Action Communication, Jun. 9, 2010, 26 pages.
Kim et al., U.S. Appl. No. 11/940,506, Office Action Communication, May 14, 2010, 16 pages.
Kim et al., U.S. Appl. No. 11/951,709, Office Action Communication, May 14, 2010, 24 pages.
Tiv, U.S. Appl. No. 11/951,712, Office Action Communication, Apr. 26, 2011, 20 pages.
Tsai, U.S. Appl. No. 11/738,711, Office Action Communication, May 23, 2011, 16 pages.
Tsai, U.S. Appl. No. 11/738,723, Office Action Communication, May 23, 2011, 16 pages.
Yang, U.S. Appl. No. 11/767,728, Office Action Communication, Aug. 10, 2012, 41 pages.
Yang, U.S. Appl. No. 11/877,926, Office Action Communication, Aug. 10, 2012, 47 pages.
Yang, U.S. Appl. No. 11/877,926, Office Action Communication, Apr. 27, 2012, 32 pages.
Yang, U.S. Appl. No. 11/767,728, Office Action Communication, May 21, 2012, 49 pages.
Tsai, U.S. Appl. No. 11/738,711, Notice of Allowance & Fees Due, May 25, 2012, 5 pages.
Tsai, U.S. Appl. No. 11/738,723, Notice of Allowance & Fees Due, May 25, 2012, 31 pages.
Yang, U.S. Appl. No. 11/767,728, Notice of Allowance & Fees Due, Nov. 15, 2012, 15 pages.
Cosby, U.S. Appl. No. 11/940,470, Examiner's Answer, Nov. 16, 2012, 36 pages.
Chambers, U.S. Appl. No. 11/951,709, Examiners Answers, Nov. 23, 2012, 28 pages.
Yang, U.S. Appl. No. 11/877,926, Final Office Action, Nov. 30, 2012, 43 pages.

* cited by examiner

VISUAL INSPECTION SYSTEM

CROSS-REFERENCE TO RELATED APPLICATIONS

This application is related in some aspects to commonly owned patent application Ser. No. 11/877,926, entitled "HIGH BANDWIDTH IMAGE PROCESSING SYSTEM", filed Oct. 24, 2007. This application is also related in some aspects to commonly owned patent application Ser. No., 11/738,723, entitled "HETEROGENEOUS IMAGE PROCESSING SYSTEM", filed Apr. 23, 2007, the entire contents of which are herein incorporated by reference. This application is also related in some aspects to commonly owned patent application Ser. No. 11/767,728, entitled "HYBRID IMAGE PROCESSING SYSTEM", filed Jun. 25, 2007, the entire contents of which are herein incorporated by reference. This application is also related in some aspects to commonly owned patent application Ser. No. 11/738,711, entitled "HETEROGENEOUS IMAGE PROCESSING SYSTEM", filed Apr. 23, 2007, the entire contents of which are herein incorporated by reference.

FIELD OF THE INVENTION

In general, the present invention relates to image processing/inspection. Specifically, the present invention relates to a visual inspection system in which an image interface unit is directly coupled to an image processing unit.

BACKGROUND OF THE INVENTION

Current image processing/inspection systems have limited processing power. Specifically, current systems perform all image processing functions within a single, general-purpose system. The processor used in current image processing/inspection systems is not powerful enough to handle the image processing demands, data rates, and algorithms for much of the current generation of (e.g., manufacturing inspection systems), let alone the next generation of systems. Next-generation manufacturing systems have a need for a fast image processing system in order to complete image inspection within required times. As the size of the inspection area and the amount of gray scale data double, the data per one scan area increases dramatically. Therefore, the image inspection processing time is drastically increased. Thus, the current inspection system(s) will not adequately handle the requirements for future manufacturing systems.

Although, image processing functions are sometimes off-loaded to another system, this other system also uses a general purpose processor that fails to actually perform any image processing acceleration. In addition, image processing functions in current systems are tied to a specific processor and platform, making it difficult to offload and accelerate specific functions at a fine-grained level. Still yet, there is a customer requirement to increase the I/O bandwidth over 5 times from the current implementation. In view of the foregoing, there exists a need for a solution that solves at least one problem in the related art.

SUMMARY OF THE INVENTION

This solution relates to machine vision computing environments, and more specifically relates to a system and method for selectively accelerating the execution of image processing applications using a cell computing system. The invention provides a high performance machine vision system over the prior art and provides method for executing image processing applications on a Cell and BPE3 image processing system. Moreover, implementations of the invention provide a machine vision system and method for distributing and managing the execution of image processing applications at a fine-grained level via a PCIe connected system. The hybrid system is replaced with the BPE3 and the switch is also eliminated from the prior in order to meet over 1 GB processing requirement.

A first aspect of the present invention provides a visual inspection system comprising: an image interface unit having at least one PCI expansion unit, the at least one PCI expansion unit have at least one frame grabber; an image processing unit having at least on co-processor, the image interface unit being coupled to the image processing unit to provide a direct connection between the at least one image grabber and the at least one co-processor.

A second aspect of the present invention provides a method for processing images, comprising: receiving image data on a set of PCI expansion units from a set of image capture devices; sending the image data to a set of image co-processors that are directly coupled to the set of PCI expansion units for processing; processing the image data using the set of image co-processors; and storing the processed image data in a drive.

A third aspect of the present invention provides at least one computer readable medium containing at least one program product for processing image data, the computer readable medium comprising program code for causing at least one computer system to: receive image data on a set of PCI expansion units from a set of image capture devices; send the image data to a set of image co-processors that are directly coupled to the set of PCI expansion units for processing; process the image data using the set of image co-processors; and store the processed image data in a drive.

A fifth aspect of the present invention provides a data processing system for processing image data, comprising: a memory medium having instructions; a buys coupled to the memory medium: receive image data on a set of PCI expansion units from a set of image capture devices; send the image data to a set of image co-processors that are directly coupled to the set of PCI expansion units for processing; process the image data using the set of image co-processors; and store the processed image data in a drive.

BRIEF DESCRIPTION OF THE DRAWINGS

These and other features of this invention will be more readily understood from the following detailed description of the various aspects of the invention taken in conjunction with the accompanying drawings in which:

FIG. 10 depicts a diagram of the visual inspection system according to

Figure 1:
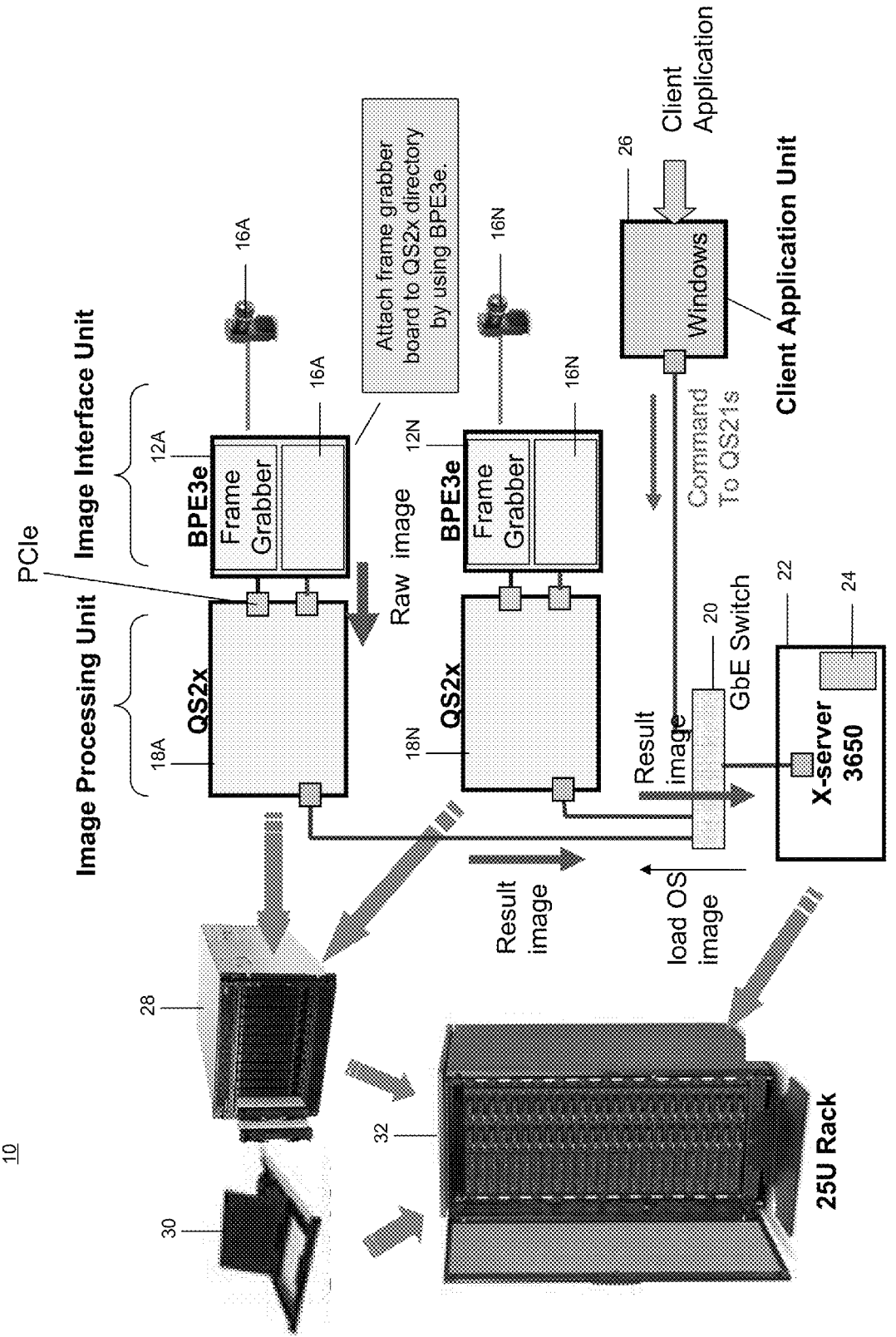
FIG. 1 shows a detailed diagram of the visual inspection system according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, this solution relates to machine vision computing environments, and more specifically relates to a system and method for selectively accelerating the execution of image processing applications using a cell computing system. The invention provides a high performance machine vision system over the prior art and provides a method for executing image processing applications on a Cell and BPE3 image processing system. Moreover, implementations of the invention provide a machine vision system and method for distributing and managing the execution of image processing applications at a fine-grained level via a PCIe connected system. The hybrid system is replaced with the BPE3 and the switch is also eliminated from the prior in order to meet 1 GB processing requirement.

Referring now to FIG. 1, a visual inspection system 10 according to the present invention is shown. As depicted, a set (one or more) of express PCI expansion units 12A-N (collectively referred to as image interface unit 13) containing a set of frame grabbers 14A-N receive image data from image capture devices 16A-N. Directly coupled to the set of PCI expansion units 12A-N are a set of image co-processors 18A-N (collectively referred to as image processing unit 15). The image data received from set of image capture devices 16A-N will be communicated directly to set of co-processors 18A-N from set of express PCI expansion units 12A-N Upon receiving the image data, set of co-processors 18A-N process the image data and send the save via a switch 20 to a server 22 where it is stored in high density drive 22. Access to the processed image data (e.g., by users), can be accomplished via a client 26. In addition, processed image data can be communicated to various other devices (28, 30, and 32) servers, racks, etc. depicts by components 28, 30, and 31. Thus, as FIG. 1 demonstrates communication between set of express PCI expansion units 12A-N and image co-processors 18A-N is direct.

Figure 2:
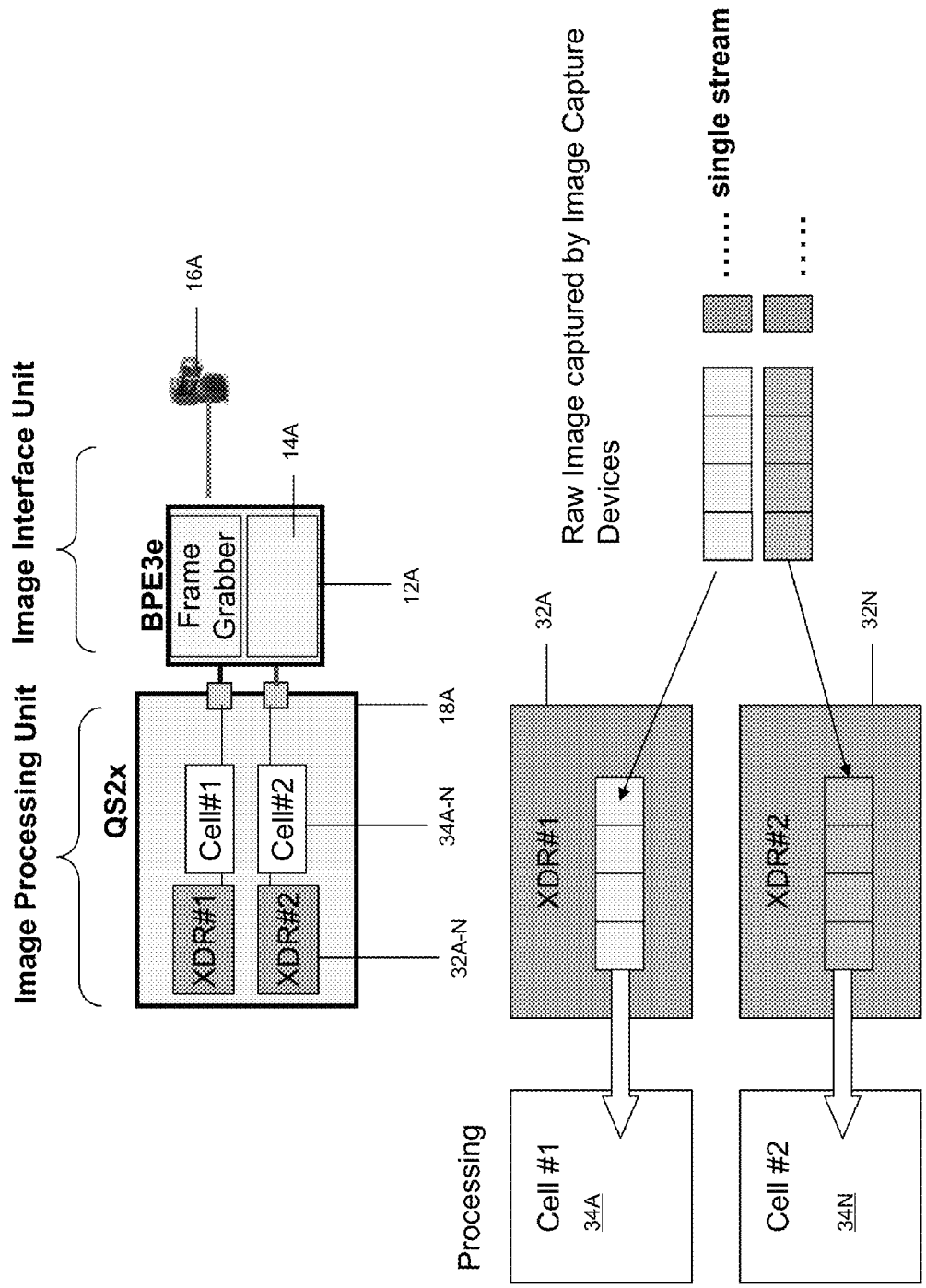
FIG. 2 depicts a more detail diagram of components of FIG. 1.

The relationship between set of express PCI expansion units 12A and set of image co-processors is shown in FIG. 2. As depicted, image data is received from image capture device 16A by at least one frame grabber 12A-N and then directly communicated to XDR memory units 32A-N as a single stream of data and then to cells 34A-N.

Figure 3:
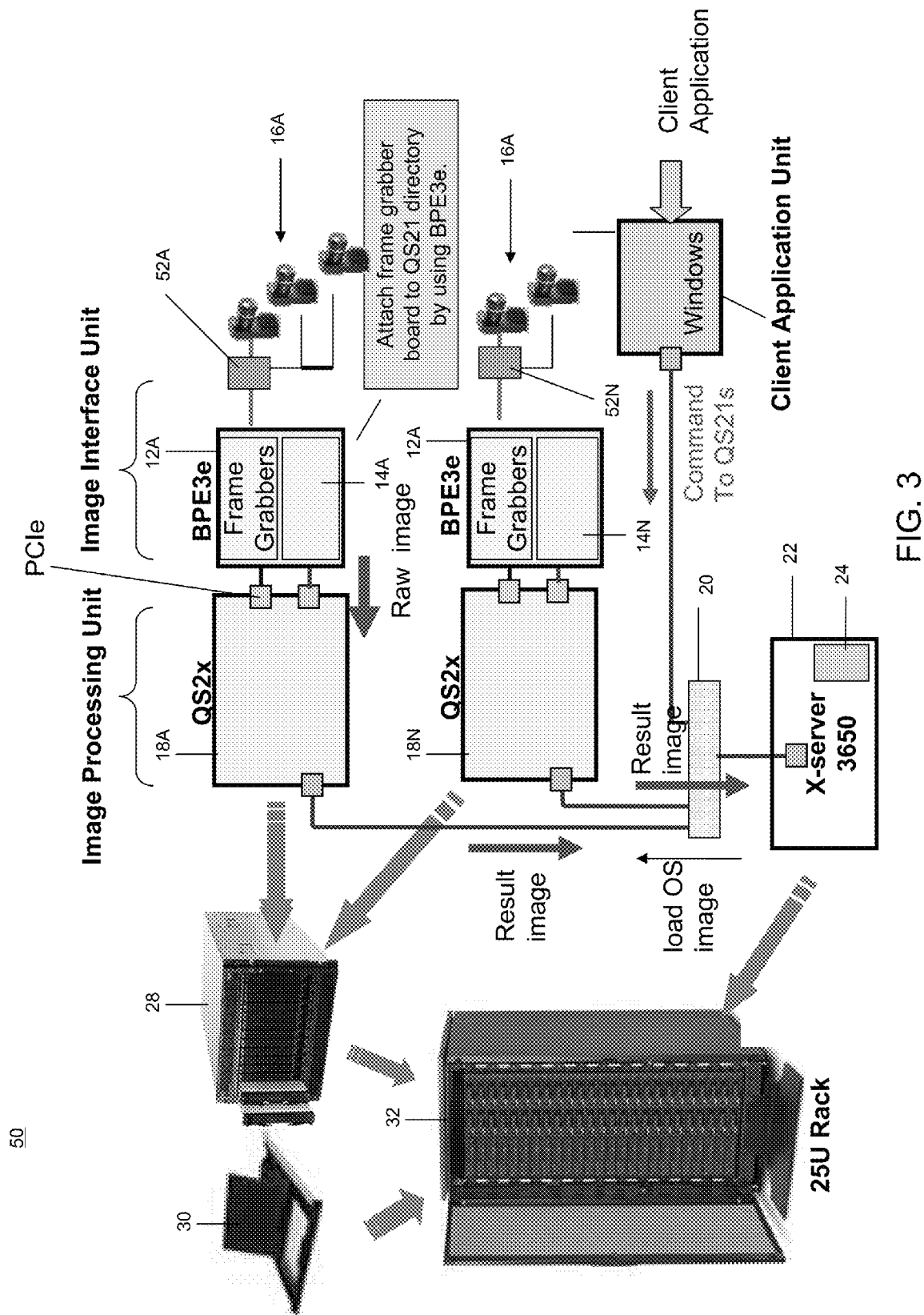
FIG. 3 shows a more detailed diagram of the visual inspection system according to another embodiment the present invention.

Referring now to FIG. 3, another embodiment of visual inspection system 50 is shown. As shown, one way visual inspection system 50 differs from that shown in FIG. 1 is that each express PCI expansion unit 12A-N receives image data via frame grabber 14A-N from multiple image capture devices 16A-N. The image data is aggregated via aggregator 52 and handled in the same manner as indicated above. Specifically, the image data received from set of image capture devices 16A-N will be communicated directly to set of co-processors 18A-N from set of express PCI expansion units 12A-N Upon receiving the image data, set of co-processors 18A-N process the image data and send the save via a switch 20 to a server 22 where it is stored in high density drive 22. Access to the processed image data (e.g., by users), can be accomplished via a client 26. In addition, processed image data can be communicated to various other devices (28, 30, and 32) servers, racks, etc. depicts by components 28, 30, and 31.

Figure 4:
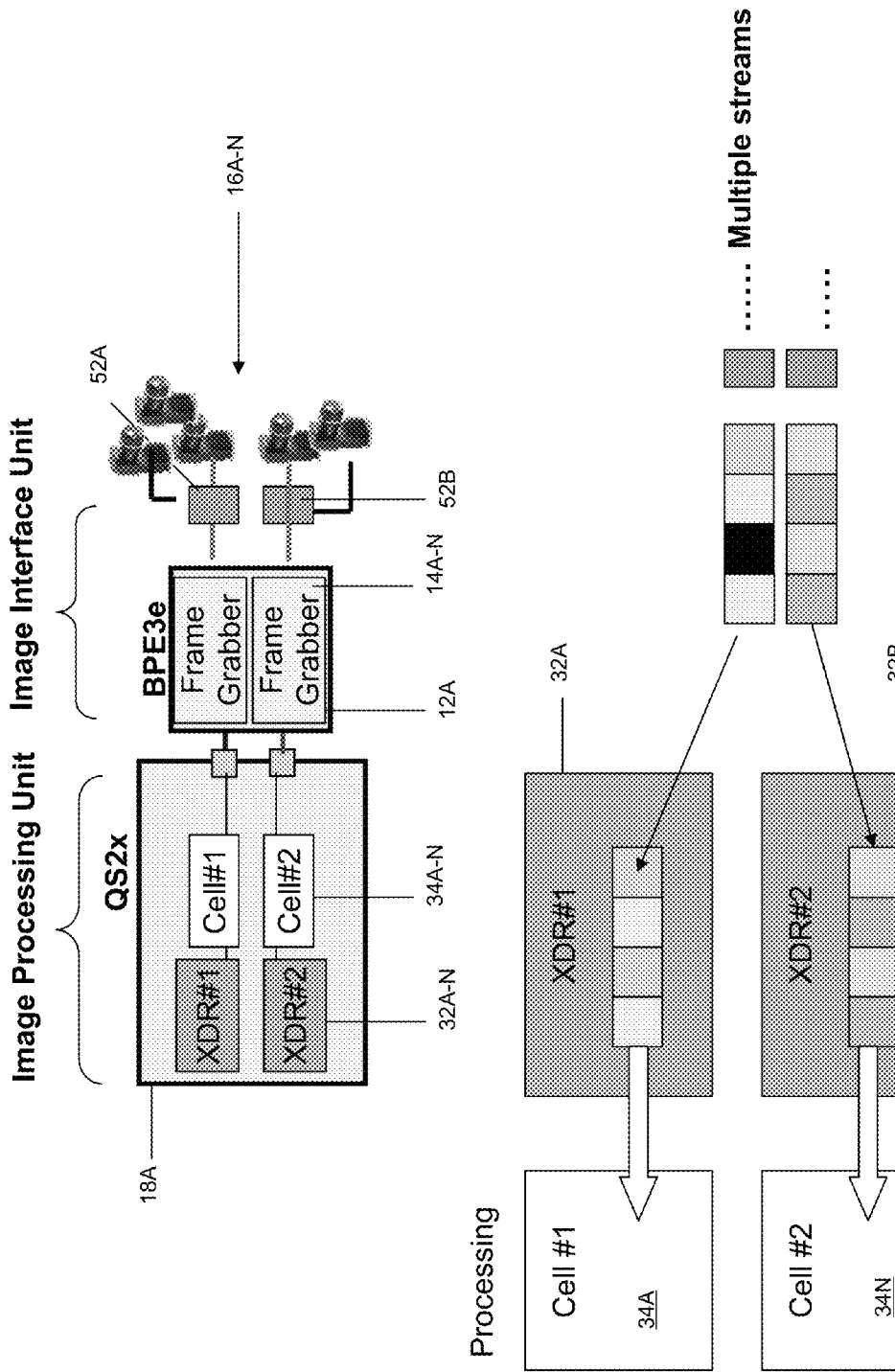
FIG. 4 depicts a more detail diagram of components of FIG. 3.

FIG. 4 shows the relationship between the components (similar to that described in FIG. 2). However, image data is received from image capture devices 16A by at least one frame grabber 12A-N and then directly communicated to XDR memory units 32A-N as multiple streams (as opposed to a single stream such as that for FIG. 2) and then to cells 34A-N.

Figure 5:
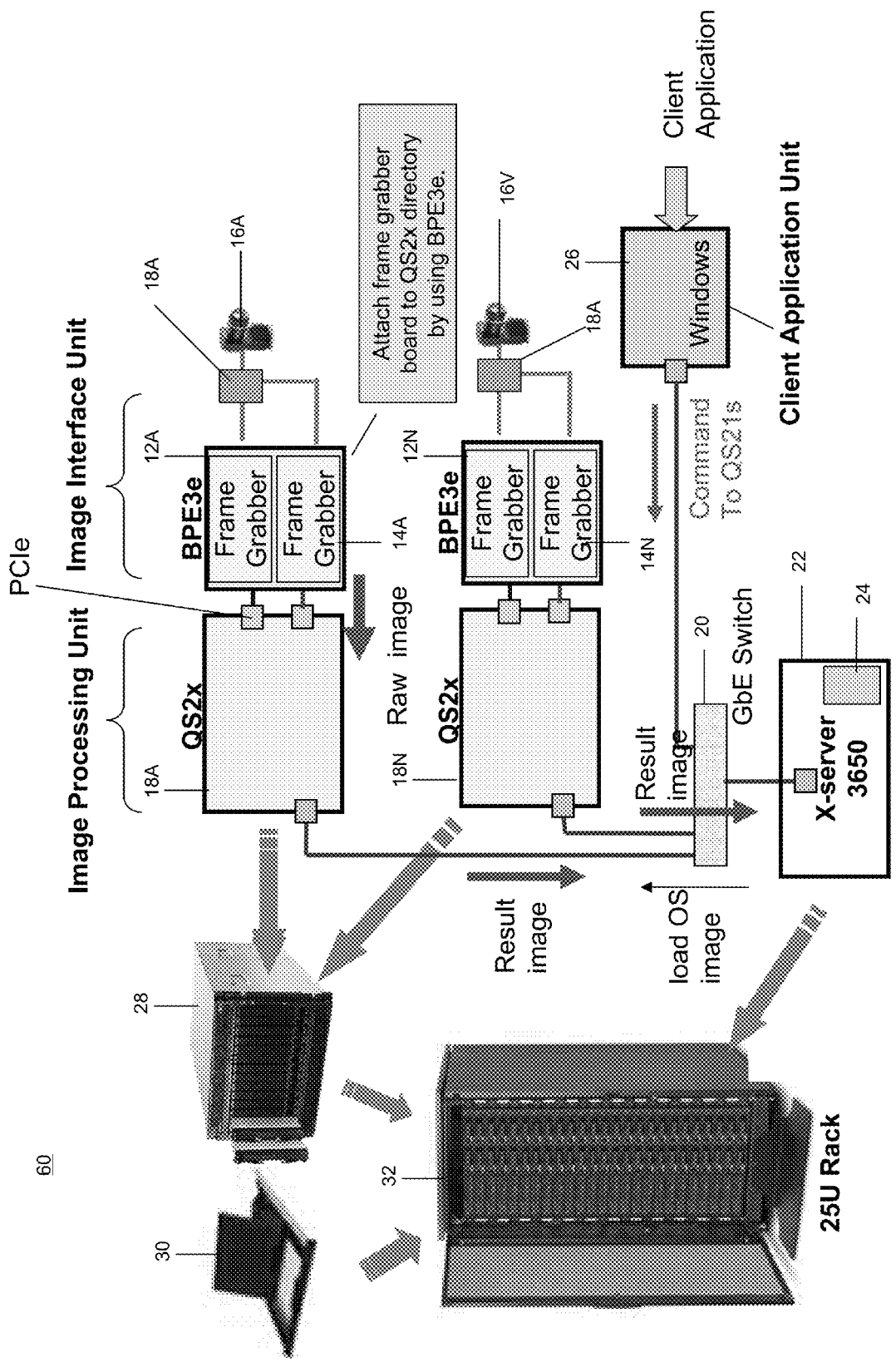
FIG. 5 shows a detailed diagram of the visual inspection system according to another embodiment the present invention.

Referring now to FIG. 5, another embodiment of visual inspection system 50 is shown. As shown, one way visual inspection system 50 differs from that shown in FIG. 1 is that image data is received from an image capture device 16A-N by a splitter 62A-N that splits the image data for so that each frame grabber 14A-N will receive a stream of image data (In FIG. 1) each image grabber 14A-N in a common express PCI expansion unit 12A need not receive a stream of image data. In any event, the image data will be communicated to a set of image co-processors 18A-N. Upon receiving the image data, set of co-processors 18A-N process the image data and send the save via a switch 20 to a server 22 where it is stored in high density drive 22. Access to the processed image data (e.g., by users), can be accomplished via a client 26. In addition, processed image data can be communicated to various other devices (28, 30, and 32) servers, racks, etc. depicts by components 28, 30, and 31.

Figure 6:
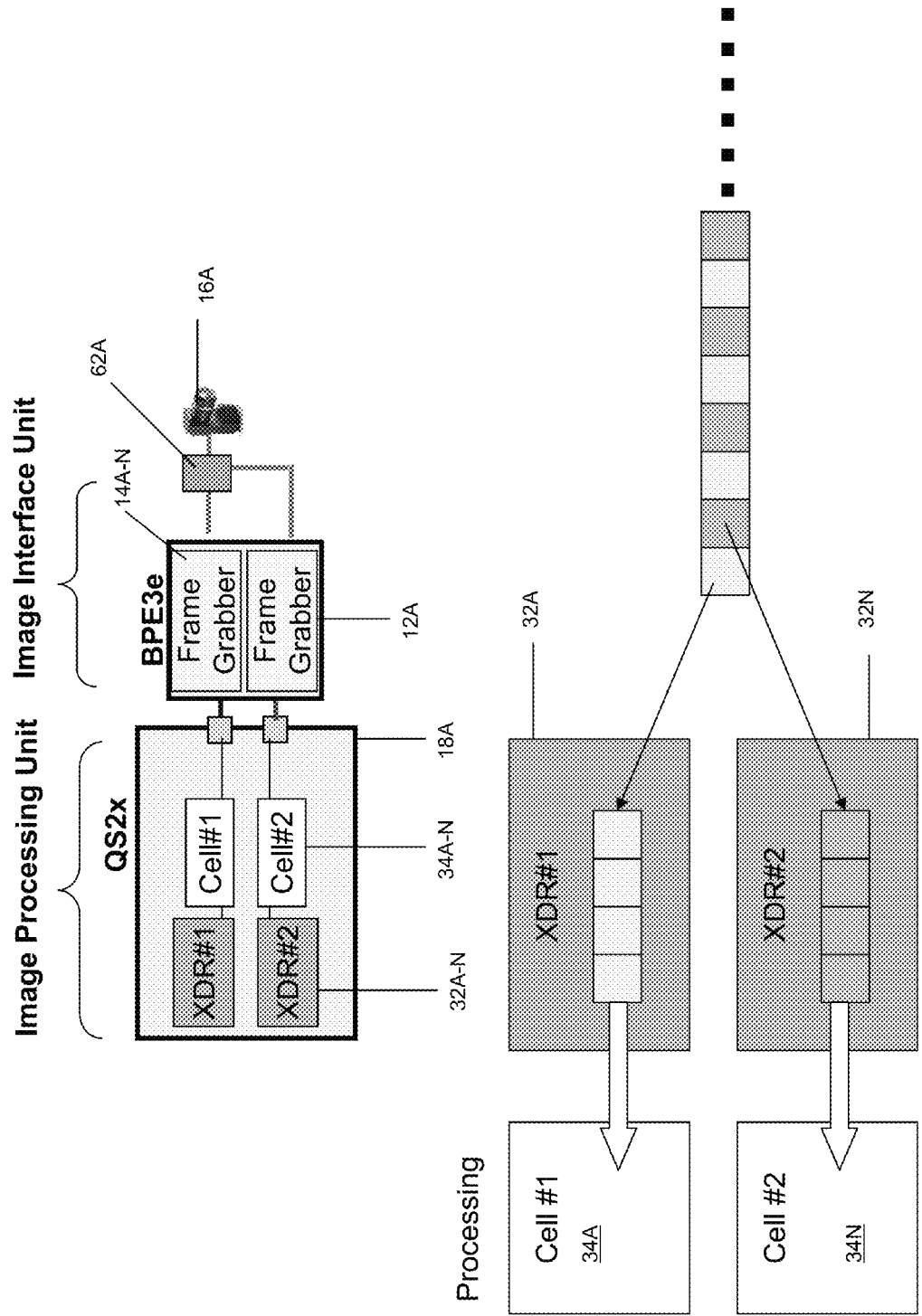
FIG. 6 depicts a more detail diagram of components of FIG. 5.

FIG. 6 shows the relationship between the components (similar to that described in FIG. 2). However, image data is received from image capture devices 16A by all frame grabbers 12A-N in a particular express PCI expansion unit and then directly communicated to image co-processor 18 where it is stored and/or handled by XDR memory units 32A-N and to cells 34A-N.

Figure 7:
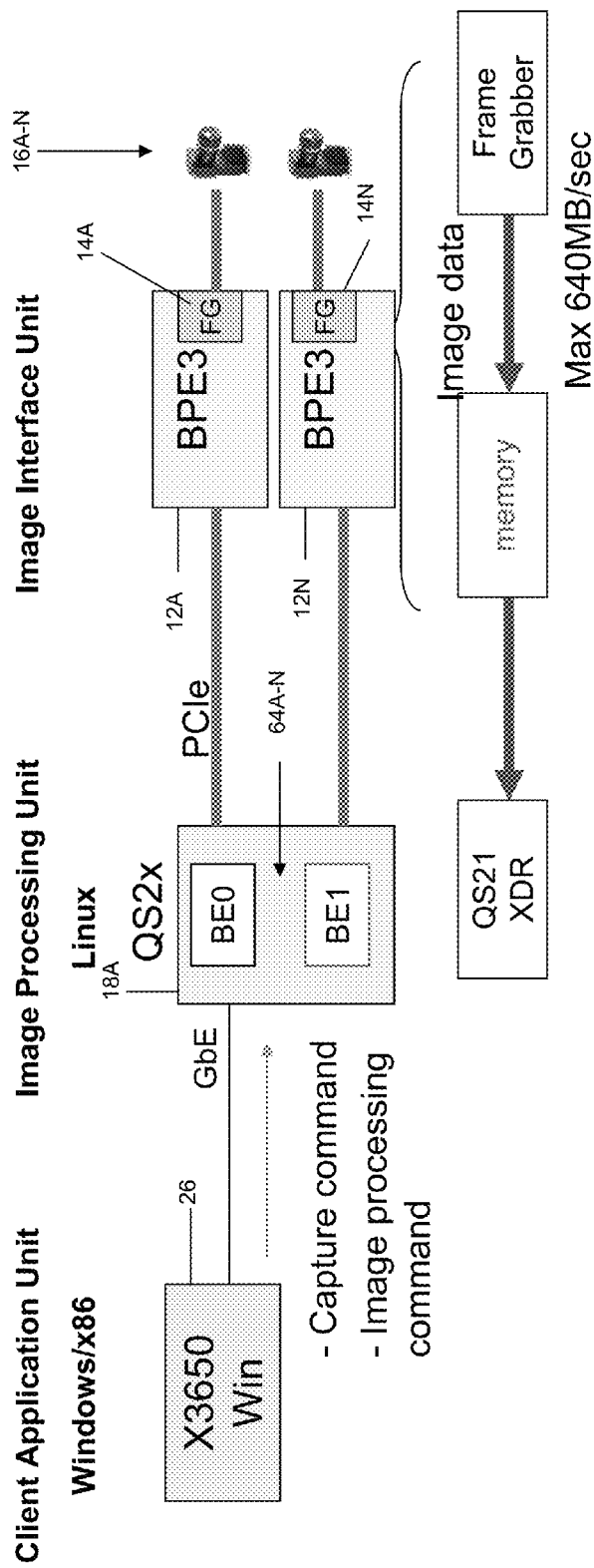
FIG. 7 depicts communication between components of the visual inspection system according to the present invention.

FIG. 7 depicts another element of the present invention. Specifically, when image data is received from image capture mechanisms 16A-N by frame grabbers 14A-N, it is communicated to image co-processors 18A-N where it is processed using broadband engines 64A-N. It should be appreciated that the processing of image data could be performed by one or more special purpose engines (SPEs) such as that shown in FIG. 2 of the patent application having the Ser. No. 11/877,926, as incorporated by reference above.

Figure 8:
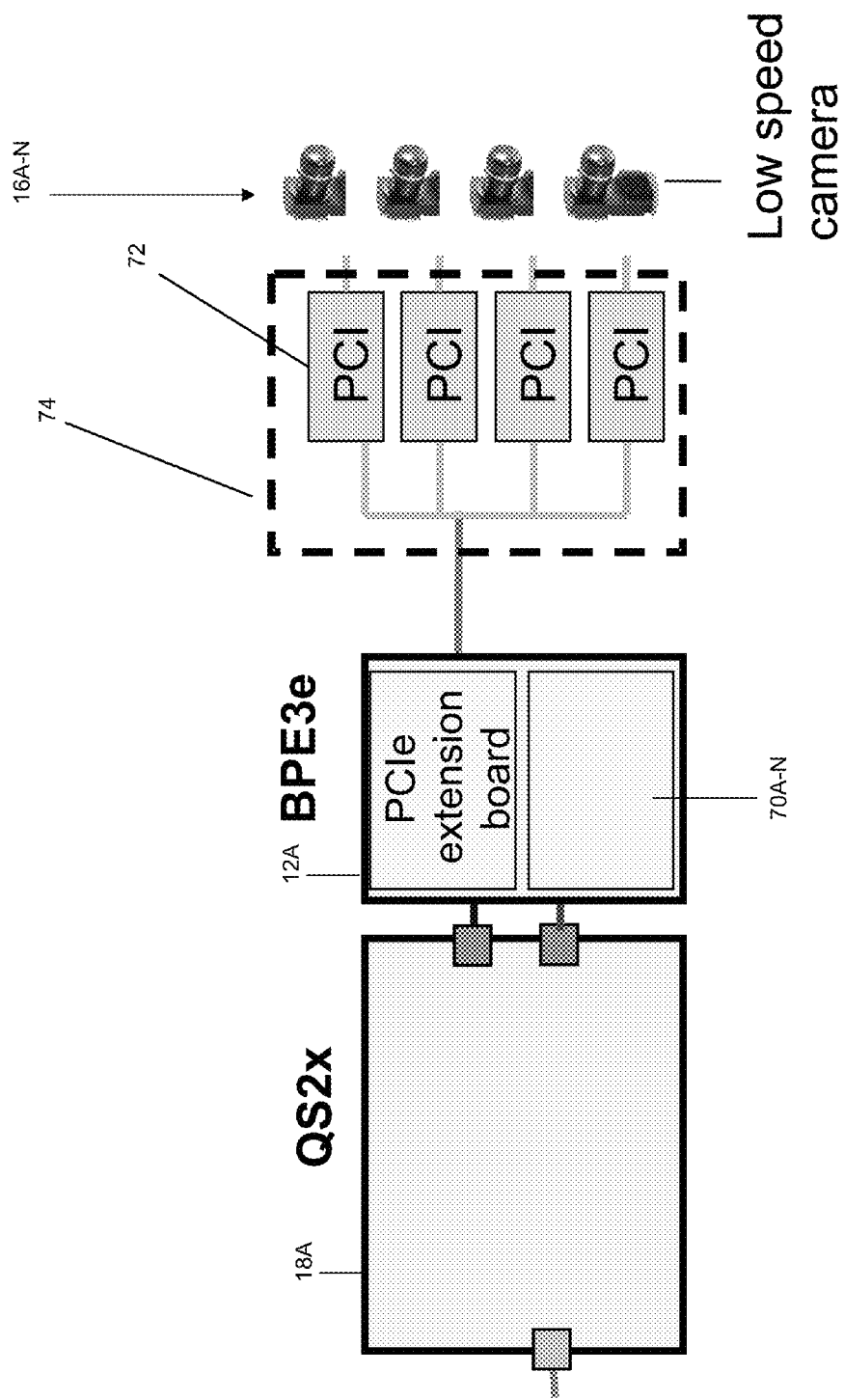
FIG. 8 depicts a diagram of the visual inspection system according to the present invention.
Figure 9:
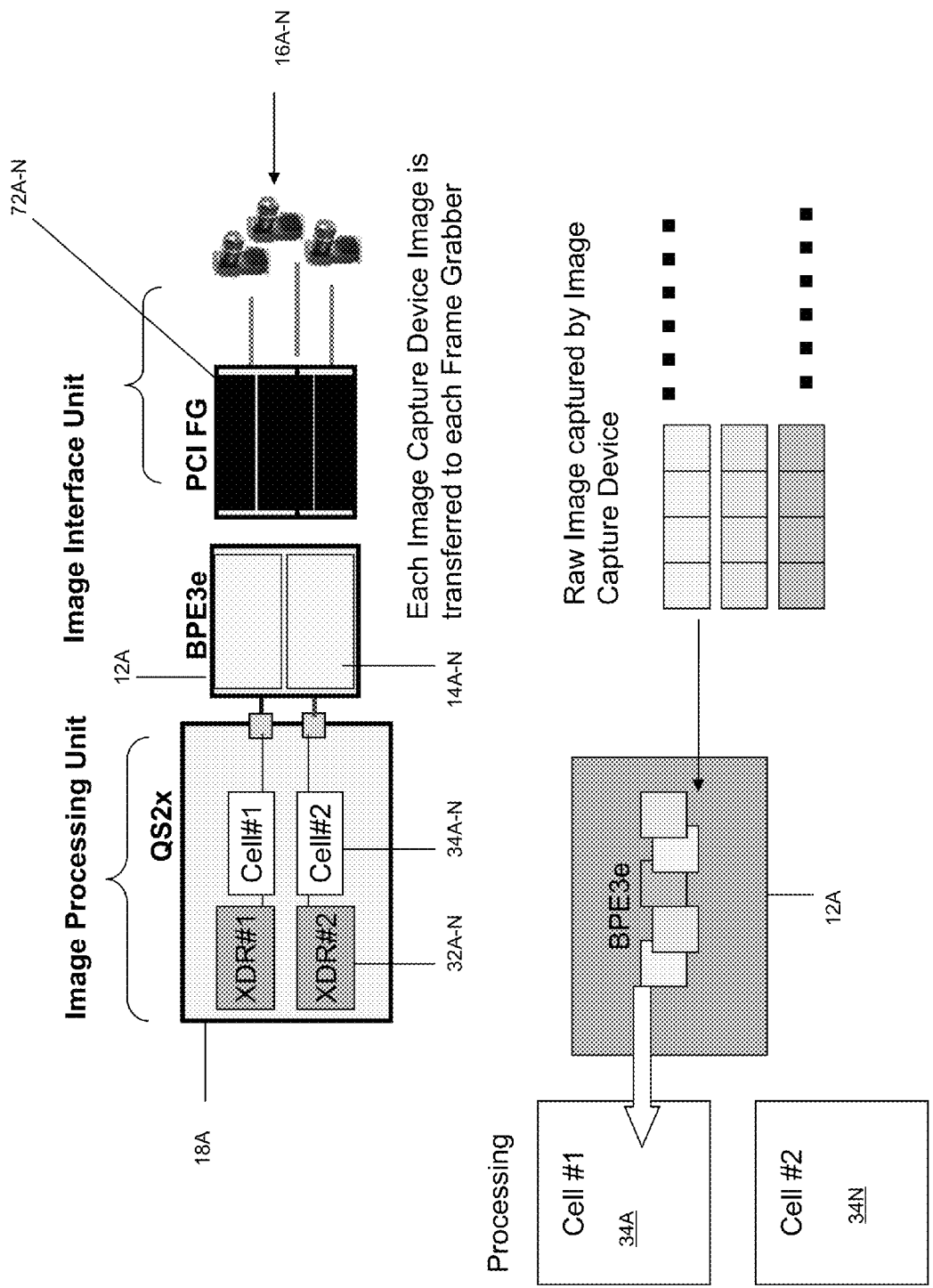
FIG. 9 depicts a diagram of the visual inspection system according to another embodiment of the present invention.

FIG. 8 shows a different configuration according to the present invention brought about by the use of additional PCI technology. Specifically, image data is initially received by PCI frame grabber boards 72A-N contained within an express PCI to PCI extension box 74. From there, image data is sent to express PCI extension boards 70A-N contained within and then directly to image co-processor 18A FIG. 9 shows the relationship between the components (similar to that described in FIG. 2). However, image data is received from image capture devices 16A by PCI frame grabber boards 72A-N in particular express PCI expansion unit and then directly communicated to image co-processor 18 where it is stored and/or handled by XDR memory units 32A-N and to cells 34A-N.

Figure 10:
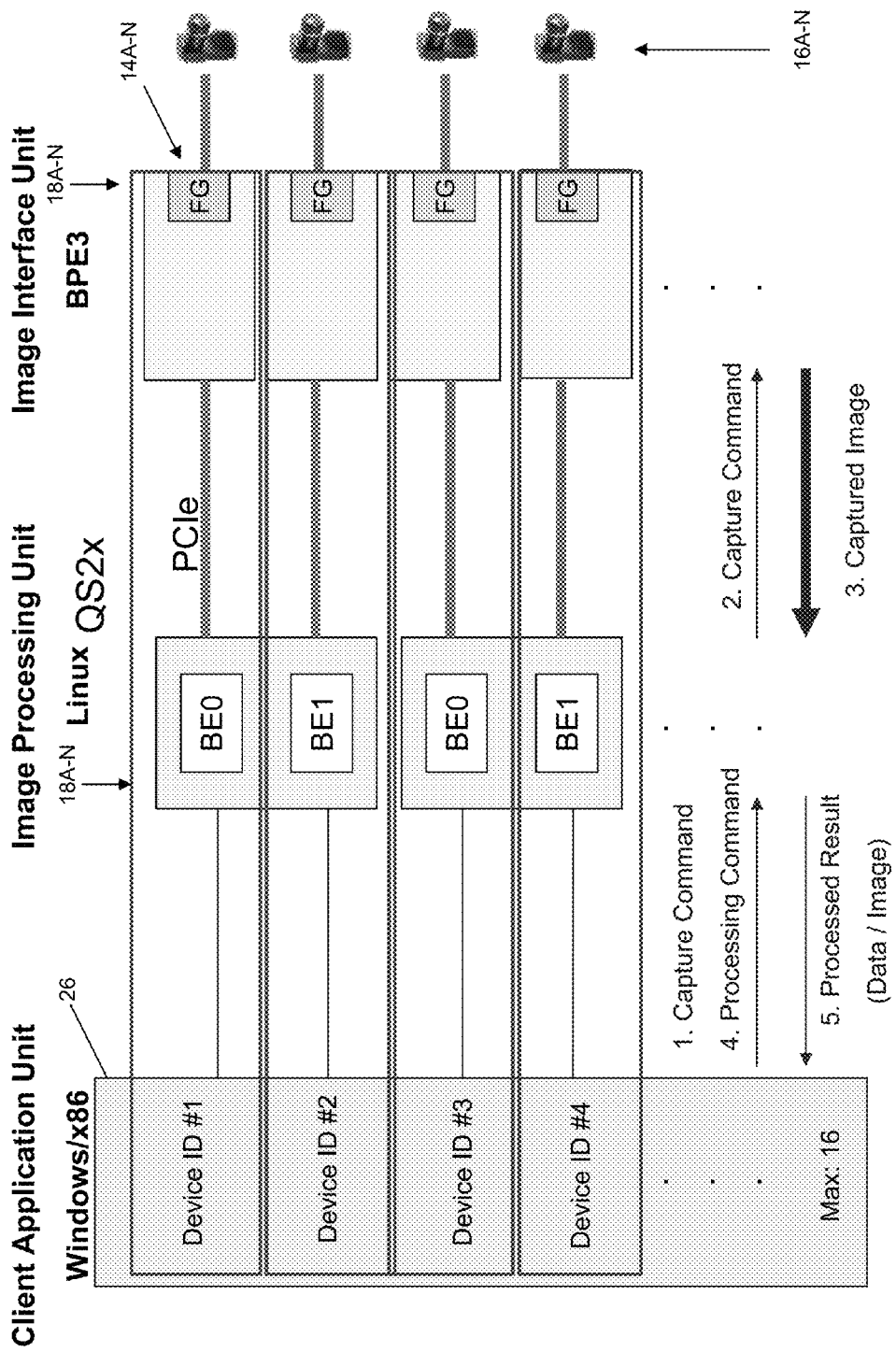

Referring now to FIG. 10 another embodiment 80 is shown. As depicted, image data is received from image capture devices 16A-N by frame grabbers 14A-N of PCI expansion units 12A-N. The image data is then directly communicated to image co-processors 18A-N where the image data is processed using broadband engines, and then passed to client 26. It should be understood.

It should be understood that the present invention can leverage come or all of the software stacks shown in the above-incorporated cases to help accomplish achieved herein. For example, the method and corresponding description of FIGS. 5-6 of application Ser. No. 11/738,723 could be utilized. It should be understood that the present invention could be deployed on one or more computing devices (e.g., servers, clients, etc.) within a computer infrastructure. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets- based protocol, and an Internet service provider could be used to establish connectivity to the Internet. Still yet, the computer infrastructure is intended to demonstrate that some or all of the components of such an implementation could be deployed, managed, serviced, etc. by a service provider who offers to implement, deploy, and/or perform the functions of the present invention for others.

Where computer hardware is provided, it is understood that any computers utilized will include standard elements such as a processing unit, a memory medium, a bus, and input/output (I/O) interfaces. Further, such computer systems can be in communication with external I/O devices/resources. In general, processing units execute computer program code, such as the software (e.g., client application 140 and cell application 154) and functionality described above (e.g., all libraries discussed herein), which is stored within memory medium(s). While executing computer program code, the processing unit can read and/or write data to/from memory, I/O interfaces, etc. The bus provides a communication link between each of the components in a computer. External devices can comprise any device (e.g., keyboard, pointing device, display, etc.) that enable a user to interact with the computer system and/or any devices (e.g., network card, modem, etc.) that enable the computer to communicate with one or more other computing devices.

The hardware used to implement the present invention can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, the processing unit therein may comprise a single processing unit, or be distributed across one or more processing units in one or more locations, e.g., on a client and server. Similarly, the memory medium can comprise any combination of various types of data storage and/or transmission media that reside at one or more physical locations. Further, the I/O interfaces can comprise any system for exchanging information with one or more external device. Still further, it is understood that one or more additional components (e.g., system software, math co-processing unit, etc.) can be included in the hardware.

While shown and described herein as an image processing/visual inspection system and method, it is understood that the invention further provides various alternative embodiments. For example, in one embodiment, the invention provides a computer-readable/useable medium that includes computer program code to enable a computer infrastructure to process images. To this extent, the computer-readable/useable medium includes program code that implements the process (es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to process images. In this case, the service provider can create, maintain, support, etc., a computer infrastructure, such as computer infrastructure that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for processing images. In this case, a computer infrastructure can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A visual inspection system, comprising:
   an image interface unit having a set of PCI expansion units, each of PCI expansion units including at least one frame grabber, wherein each of the PCI expansion units receives image data as a feed from a single image capture device;
   a splitter for splitting the feed of the image data to separate frame grabbers on a single PCI expansion unit; and
   an image processing unit having at least one co-processor, the image interface unit being coupled to the image processing unit to provide a direct connection between the at least one frame grabber and the at least one co-processor.

2. The visual inspection system of claim 1, each image co-processor comprising extreme random access memory and a cell.

3. The visual inspection system of claim 1, further comprising a server coupled to the image processing unit, the server receiving processed image data from the image processing unit.

4. The visual inspection unit of claim 3, the server comprising a high density drive for storing the processed image data.

5. The visual inspection system of claim 1 further comprising a set of image capture devices.

6. The visual inspection system of claim 1, further comprising an aggregator for image capture devices with PCI expansion units.

7. A method for processing images, comprising:
   receiving image data on a set of PCI expansion units from a set of image capture devices, wherein each of the set of PCI expansion units receives image data as a feed from a single image capture device, and splitting the feed between multiple frame grabbers on a single PCI expansion unit;
   sending the image data to a set of image co-processors that are directly coupled to the set of PCI expansion units for processing;
   processing the image data using the set of image co-processors; and
   storing the processed image data in a drive.

8. The method of claim 7, each image co-processor in the set of image co-processors comprising extreme random access memory and a cell.

9. The method of claim 7, further comprising sending the processed image data to a server prior to the storing.

10. The method of claim 9, the server comprising the drive and the drive being a high density drive.

11. The method of claim 7, further comprising a set of image capture devices.

12. The method of claim 11, each PCI expansion unit in the set of PCI expansion units receiving image data from a plurality of image capture devices.

13. The method of claim 12, further comprising an aggregator for receiving the image data from the plurality image capture devices, the image data being communicated from the aggregator to the single PCI expansion unit.

14. At least one non-transitory computer readable medium containing at least one program product for processing image data, the non-transitory computer readable medium comprising program code for causing at least one computer system to:
   receive image data on a set of PCI expansion units from a set of image capture devices, wherein each of the set of PCI expansion units receives image data as a feed from a single image capture device, and splitting the feed between multiple frame grabbers on a single PCI expansion unit;
   send the image data to a set of image co-processors that are directly coupled to the set of PCI expansion units for processing;
   process the image data using the set of image co-processors; and
   store the processed image data in a drive.

15. The at least one non-transitory computer readable medium containing the at least one program product of claim 14, the computer readable medium further comprising program code for further causing the computer system to send the processed image data to a server prior to the storing.

16. A method for deploying at least one application for processing image data, comprising:
   deploying a computer infrastructure configured to:
      receive image data on a set of PCI expansion units from a set of image capture devices, wherein each of the set of PCI expansion units receives image data as a feed from a single image capture device, and splitting the feed between multiple frame grabbers on a single PCI expansion unit;
      send the image data to a set of image co-processors that are directly coupled to the set of PCI expansion units for processing;
      process the image data using the set of image co-processors; and
      store the processed image data in a drive.

17. The method of claim 16, the computer infrastructure being further configured to send the processed image data to a server prior to the storing.

18. The method of claim 17, the server comprising the drive and the drive being a high density drive.

* * * * *